Jan. 30, 1945.　　　H. KATTWINKEL　　　2,368,304
CLUTCH, ESPECIALLY FOR MOTOR CARS WITH CONTROL CHANGE MECHANISM
Filed July 11, 1941
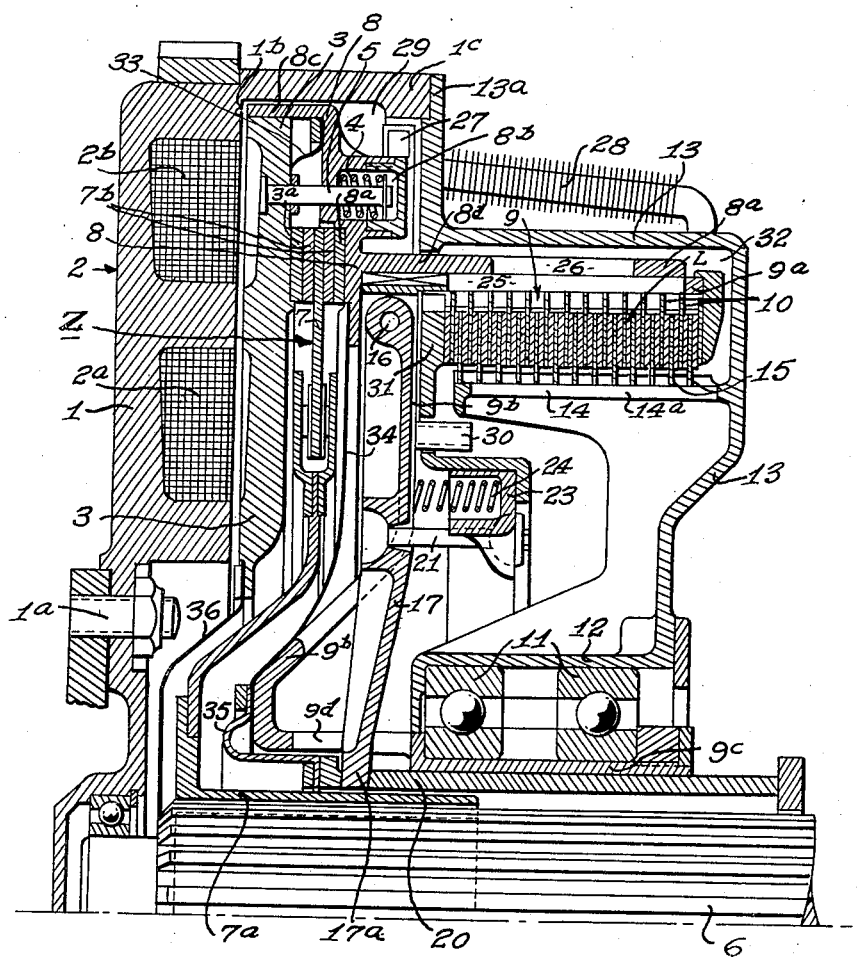
Inventor
HANS KATTWINKEL
By Allen Holcombe
Attorney.

Patented Jan. 30, 1945

2,368,304

UNITED STATES PATENT OFFICE 2,368,304

CLUTCH, ESPECIALLY FOR MOTOR CARS WITH CONTROL CHANGE MECHANISM

Hans Kattwinkel, Radebeul, Germany; vested in the Alien Property Custodian

Application July 11, 1941, Serial No. 402,024
In Germany February 29, 1940

6 Claims. (Cl. 192—48)

There exist clutches consisting of the union of an one-disk clutch (additional clutch) with a lamellae clutch, one of the lamellae carriers of which (loose lamellae carrier) is rotatably supported with relation to the two shafts or the like which are to be coupled with one another. The construction is such that when the coupling procedure commences the loose lamellae carrier is first coupled with the shaft or the like concerned with the aid of the additional clutch, and only now the running clutch is operated, whereas, reversely thereto, when the clutch is to be disengaged first the running clutch and only thereafter the additional clutch is relieved, or opened respectively.

With clutches of this type the lamellae clutch runs preferably in oil or the like in order to secure a friction value which, although low, is nevertheless possibly constant, whereas the friction surfaces of the additional clutch must be prevented from coming in contact with the oil or the like. This is attained, according to the present invention, by an arrangement and combination of the parts concerned in which the additional clutch is liquid-tight separated from that part of the clutch casing which surrounds the lamellae clutch by means of diaphragms which connect on the one hand the pressure plates of the additional clutch with the thrust collar, and on the other hand this ring with the inner end of the loose lamellae carrier. That separating closure is preferably completed by a cuff connecting the hub part of the loose lamellae carrier with the adjusting collar and by an annular disk extending from the inner rim of the pressure plate of the additional clutch to the proximity of the shaft.

The invention is illustrated diagrammatically and by way of example on the accompanying drawing on which is shown a preferred constructional form of a clutch intended to constitute an intermediate member between the motor and the shaft transmitting the power to the gearing. The figure shows an axial section through one half of the clutch, it being understood that the other half is of accurately the same design. This clutch is electromagnetically operated. I wish it, however, to be understood that my invention is not restricted to clutches of this type, but it can be advantageously employed in all cases in which a lamellae clutch is combined with a simple friction clutch and both are housed in a common casing.

Referring to the figure shown 1 denotes the fly disk of the motor which is connected with the motor shaft by a flange and connecting members such as $1^a$ or the like. This disk 1 is so designed as to constitute the body of an electromagnet and is provided with two annular concentric grooves containing the coils $2^a$ and $2^b$. The armature of the electromagnet is formed by an annular disk 3 serving at the same time as pressure plate for the additional clutch Z which is designed as a one-disk clutch. The friction disk 7 of this clutch is connected by means of a hub body $7^a$ in such a manner with the shaft 6 transmitting the power to the gearing that it can rotate upon said shaft, but is not axially shiftable thereon. The friction disk 7 is in the usual manner provided on its outer rim with rings consisting of a material suited to produce friction, and opposite these rings are counterrings $3^a$ and $8^a$ cooperating with them and consisting of a sort of steel likewise suited to produce friction. The friction ring $3^a$ is fastened to the armature 3 and the friction ring $8^a$ is fastened to the annular body 8 which serves on the one hand as a thrust block for the additional clutch Z and on the other hand as carrier for a plurality of springs 4 distributed around the circumference of the same and tending to secure the position of the armature disk 3 relatively to the friction disk 7. The springs 4 are housed in pot-like recesses $8^b$ of the annular body 8; each thereof contacts at one end with the body of the respective recess $8^b$ and at the other end with the washer of a bolt 5, the other end of which is secured to the armature disk 3. This latter is guided in a rim-shaped extension $8^c$ of the annular body and prevented by suitable means from rotating relatively thereto. The annular body 8 is supported by the intermediary of its sleeve-like part $8^d$ upon the loose lamellae carrier 9 of the lamellae clutch L in such manner, that it cannot rotate, but can be axially shifted upon it. This axial movement is limited in left-hand direction by means of an abutment member $1^b$ provided at the fly disk 1, the position being then such a one in which the armature disk 3 that is connected with the annular body 8 has not yet finished its stroke directed towards the electromagnet 2.

The loose lamellae carrier 9 consists substantially of a hollow cylinder $9^a$ provided in its interior in the usual manner with ledges distributed around the circumference of said lamellae which receive the one group (10) of the lamellae that are provided with suitably shaped and arranged rim grooves; further a disk body 9$^b$ and a sleeve-like hub body 9$^c$. The loose lamellae carrier is rotatably supported relatively to the motor shaft, as well as to the gearing shaft, said carrier being equipped for said purpose with ball bearings 11 housed in the sleeve-like part 12 of the clutch casing 13. This latter enclosed the entire clutch device and is connected at 13$^a$ with a rim-like projection 1$^c$ of the fly disk 1. The casing 13 supports at the same time the other interior lamellae carrier 14 which carries the other group 15 of the lamellae.

The clutch levers 17 are supported at 16 at the exterior, loose lamellae carrier and extend with their inners ends 17$^a$ through recesses 9$^d$ provided in the hub part 9$^c$, where they are jointed to the adjusting collar 20 of the clutch which can be axially shifted in the usual manner by means of the clutch pedal of the car concerned by the intermediary of a clutch ring acting upon the right-hand end of said collar, this latter taking the inner ends of the levers 17 along with it. The levers 17 are connected with an annular body 23 by the intermediary of draw members 21 designed as screw bolts, the connection being such that the body 23 is taken along with said members when the levers 17 are turned in clockwise direction by shifting of the collar 20 to the left, counter to the action of the springs 24 that are distributed around the circumference, the springs being supported at their lower ends by the disk-shaped part 9$^b$ of the loose lamellae carrier 9. The draw bolts 21 have ball-shaped heads or correspondingly shaped bolts by the intermediary of which they are suspended in correspondingly shaped recesses of the clutch levers 17, or of the annular body 23 respectively.

Within the range of one of the clutch levers 17 or of the clutch pedal which the driver operates directly a contact may be inserted into the circuit of the coils of the electromagnet 2$^a$2$^b$ and closed when the driver depresses the pedal.

The clutch casing 13 is closed, except at the annular slot where there are the ball bearings 11; it is partly filled with oil serving to lubricate and cool the lamellae clutch. The oil is caused to circulate through a cooling device comprising the ribbed pipes 28 situated outside the casing, the circulation being effected by means of scoop pipes 27 affixed to the loose lamellae carrier 9 and which conduct the oil from the space 29 of the casing 13 which surrounds the annular body 8, to branches 30 which supply the oil to slots 14$^a$ in the stationary lamellae carrier 14 through which the oil passes between the lamellae and thence through slots 25 and 26 into the space 32 of the casing 13 from which it passes through the ribbed pipes 28 back to the space 29.

In order to hold the oil off from the additional clutch Z, this latter is separated from the space enclosing clutch L in a liquid-tight manner. This is effected in the constructional form shown by way of example on the one hand with the aid of two diaphragms 33 and 34 which connect the armature disk 3 with the annular body 8 and this body with the disk-shaped part 9$^b$ of the loose lamellae carrier, and on the other hand by means of a cuff 35 connecting said part 9$^b$ with the adjusting collar 20. Besides, a crooked sheet-metal disk 36 is provided, the outer rim of which is connected up to the inner rim of the armature disk 3 and the inner rim of which extends closely to the shaft 6.

I claim:

1. A clutch, especially for motor cars with control change mechanism, comprising, in combination a driving shaft, a driven shaft, a lamellae clutch, one of the lamellae carriers of which is rotatably supported with respect to the said shafts to be coupled with each other, a simple friction clutch for the connection of said lamellae carrier with the driven shaft, a casing within which the said lamellae carrier and said friction clutch are enclosed, and a liquid-tight wall dividing said casing into two compartments, in which are located the said carrier and the said clutch respectively.

2. A clutch, especially for use in connection with motor cars equipped with a control change mechanism having a driving shaft and a driven shaft, comprising a lamallae clutch, the loose lamellae carrier of which is rotatably supported with respect to the said shafts to be coupled with one another, and comprising, further, an additional clutch designed as a simple friction clutch, for the connection of said lamellae carrier with the driven shaft, a casing enclosing both clutches with a circumferential wall, and a liquid-tight wall located within said casing and separating the two clutches from one another.

3. A clutch, especially for motor cars equipped with a control change mechanism having a driving shaft and a driven shaft, comprising, in combination with a lamellae clutch, one of the lamellae carriers of which is rotatably supported with respect to the said shafts to be coupled with one another, a simple friction clutch for the connection of said lamellae carrier with the driven shaft, a casing in which the two clutches are housed, and a liquid-tight wall arranged within said casing to form two compartments in which the two clutches are respectively disposed.

4. A clutch as specified in claim 2, characterised by the feature that the wall separating the two clutches from one another within the casing extends from the circumferential wall of the casing inwardly to a hub body of the loose lamellae carrier and is tightened with respect to said hub body, substantially as set forth.

5. A clutch as specified in claim 2, characterised by the feature that the friction clutch has a pressure plate and a thrust ring, and the wall separating the two clutches from one another within the casing comprises two diaphragms connecting on the one hand the pressure plate of the additional clutch with the thrust ring and on the other hand said ring with the inner end of the loose lamellae carrier, substantially as set forth.

6. A clutch as specified in claim 2, characterised by the provision of a hub part on the said carrier, a collar loose on the driven shaft for adjusting said carrier, an annular pressure plate in the friction clutch, a cuff connecting the said hub part with the said adjusting collar, and of an annular disk extending from the inner rim of the said pressure plate to the proximity of the driven shaft, substantially as set forth.

HANS KATTWINKEL.